US011748535B2

(12) United States Patent
Cherif et al.

(10) Patent No.: US 11,748,535 B2
(45) Date of Patent: *Sep. 5, 2023

(54) SYSTEM AND METHOD TO GENERATE A NETWORK-ON-CHIP (NOC) DESCRIPTION USING INCREMENTAL TOPOLOGY SYNTHESIS

(71) Applicant: ARTERIS, INC., Campbell, CA (US)

(72) Inventors: Moez Cherif, Santa Cruz, CA (US); Benoit De Lescure, Campbell, CA (US)

(73) Assignee: ARTERIS, INC., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/239,693

(22) Filed: Apr. 26, 2021

(65) Prior Publication Data

US 2022/0188490 A1 Jun. 16, 2022

Related U.S. Application Data

(63) Continuation of application No. 16/728,185, filed on Dec. 27, 2019, now Pat. No. 10,990,724.

(51) Int. Cl.
*G06F 30/327* (2020.01)
*G06F 30/392* (2020.01)

(52) U.S. Cl.
CPC .......... *G06F 30/327* (2020.01); *G06F 30/392* (2020.01)

(58) Field of Classification Search
CPC ............................ G06F 30/327; G06F 30/392
USPC ........................................................ 716/104
See application file for complete search history.

(56) References Cited

U.S. PATENT DOCUMENTS

| 5,485,396 A | 1/1996 | Brasen et al. |
| 5,541,849 A | 7/1996 | Rostoker et al. |
| 5,623,420 A | 4/1997 | Yee et al. |
| 5,638,288 A | 6/1997 | Deeley |
| 5,761,078 A | 6/1998 | Fuller et al. |
| 5,903,886 A | 5/1999 | Heimlich et al. |
| 5,983,277 A | 11/1999 | Heile et al. |
| 6,002,857 A | 12/1999 | Ramachandran |
| 6,134,705 A * | 10/2000 | Pedersen ............. G06F 30/33 716/103 |

(Continued)

FOREIGN PATENT DOCUMENTS

| CN | 105187313 A * | 12/2015 |
| CN | 109587081 A | 4/2019 |

(Continued)

OTHER PUBLICATIONS

David Atienza et al., Network-on-Chip Design and Synthesis Outlook, Science Direct, INTEGRATION the VLSI, journal 41 (2008) 340-359.

(Continued)

*Primary Examiner* — Suresh Memula
(74) *Attorney, Agent, or Firm* — DANA LEGAL SERVICES; Jubin Dana

(57) ABSTRACT

Systems and methods are disclosed synthesis of network, such as a network-on-chip (NoC). The network is initially synthesized. In accordance with various embodiments and aspects of the invention, a tool is used to synthesize and generate the NoC from a set of constraints. The tool produces consistent results between different synthesis runs, which have slight varying constraints.

14 Claims, 6 Drawing Sheets

(56) References Cited

U.S. PATENT DOCUMENTS

| | | | |
|---|---|---|---|
| 6,145,117 A | 11/2000 | Eng | |
| 6,249,902 B1 | 6/2001 | Igusa et al. | |
| 6,321,363 B1* | 11/2001 | Huang | G06F 30/33 |
| | | | 716/136 |
| 6,360,356 B1 | 3/2002 | Eng | |
| 6,378,121 B2 | 4/2002 | Hiraga | |
| 6,437,804 B1 | 8/2002 | Ibe et al. | |
| 6,449,761 B1 | 9/2002 | Greidinger et al. | |
| 6,622,225 B1 | 9/2003 | Kessler et al. | |
| 6,883,455 B2 | 4/2005 | Maeda et al. | |
| 6,907,591 B1 | 6/2005 | Teig et al. | |
| 7,096,436 B2 | 8/2006 | Bednar et al. | |
| 7,398,497 B2 | 7/2008 | Sato et al. | |
| 7,587,687 B2* | 9/2009 | Watanabe | G06F 30/30 |
| | | | 716/103 |
| 7,788,625 B1 | 8/2010 | Donlin et al. | |
| 8,042,087 B2 | 10/2011 | Murali et al. | |
| 8,302,041 B1* | 10/2012 | Chan | G06F 30/392 |
| | | | 716/132 |
| 8,819,611 B2 | 8/2014 | Philip et al. | |
| 9,184,998 B2 | 11/2015 | Xue | |
| 9,262,359 B1 | 2/2016 | Noice et al. | |
| 9,444,702 B1 | 9/2016 | Raponi et al. | |
| 9,569,574 B1 | 2/2017 | Khan et al. | |
| 9,792,397 B1 | 10/2017 | Nagaraja | |
| 9,825,779 B2 | 11/2017 | Ruymbeke et al. | |
| 9,940,423 B2 | 4/2018 | Lescure | |
| 10,068,047 B1 | 9/2018 | Finn | |
| 10,282,502 B1 | 5/2019 | BShara et al. | |
| 10,348,563 B2 | 7/2019 | Rao et al. | |
| 10,460,062 B2 | 10/2019 | Feld et al. | |
| 10,733,350 B1 | 8/2020 | Prasad et al. | |
| 10,922,471 B2 | 2/2021 | Baeckler et al. | |
| 10,990,724 B1* | 4/2021 | Cherif | G06F 30/392 |
| 11,121,933 B2* | 9/2021 | Cherif | H04L 43/0811 |
| 11,281,827 B1 | 3/2022 | Labib et al. | |
| 11,449,655 B2* | 9/2022 | Cherif | G06F 30/327 |
| 2003/0093765 A1 | 5/2003 | Lam et al. | |
| 2004/0040007 A1 | 2/2004 | Harn | |
| 2004/0230919 A1 | 11/2004 | Balasubramanian et al. | |
| 2005/0073316 A1 | 4/2005 | Graham | |
| 2005/0268258 A1 | 12/2005 | Decker | |
| 2007/0156378 A1* | 7/2007 | McNamara | G06F 30/33 |
| | | | 703/14 |
| 2007/0157131 A1* | 7/2007 | Watanabe | G06F 30/30 |
| | | | 716/102 |
| 2007/0174795 A1* | 7/2007 | Lavagno | G06F 30/327 |
| | | | 716/132 |
| 2007/0186018 A1 | 8/2007 | Radulescu et al. | |
| 2008/0046854 A1 | 2/2008 | Tang | |
| 2008/0049753 A1 | 2/2008 | Heinze et al. | |
| 2008/0279183 A1 | 11/2008 | Wiley et al. | |
| 2008/0291826 A1 | 11/2008 | Licardie et al. | |
| 2009/0031277 A1 | 1/2009 | Mcelvain et al. | |
| 2009/0313592 A1 | 12/2009 | Murali et al. | |
| 2010/0061352 A1 | 3/2010 | Fasolo et al. | |
| 2010/0162189 A1* | 6/2010 | Lavagno | G06F 30/327 |
| | | | 716/103 |
| 2010/0218146 A1* | 8/2010 | Platzker | G06F 30/327 |
| | | | 716/103 |
| 2010/0274785 A1 | 10/2010 | Procopiuc et al. | |
| 2011/0170406 A1 | 7/2011 | Krishnaswamy | |
| 2012/0013509 A1 | 1/2012 | Wisherd et al. | |
| 2012/0311512 A1 | 12/2012 | Michel et al. | |
| 2013/0174113 A1 | 7/2013 | Lecler et al. | |
| 2013/0258847 A1 | 10/2013 | Zhang et al. | |
| 2013/0283226 A1 | 10/2013 | Ho et al. | |
| 2014/0115218 A1 | 4/2014 | Philip et al. | |
| 2014/0126572 A1 | 5/2014 | Hutton et al. | |
| 2014/0153575 A1 | 6/2014 | Munoz | |
| 2014/0160939 A1 | 6/2014 | Arad et al. | |
| 2014/0169173 A1 | 6/2014 | Naouri et al. | |
| 2014/0204735 A1 | 7/2014 | Kumar et al. | |
| 2014/0211622 A1 | 7/2014 | Kumar et al. | |
| 2014/0298281 A1 | 10/2014 | Varadarajan et al. | |
| 2015/0036536 A1* | 2/2015 | Kumar | H04L 41/0826 |
| | | | 370/254 |
| 2015/0106778 A1 | 4/2015 | Mangano et al. | |
| 2015/0178435 A1 | 6/2015 | Kumar | |
| 2015/0254325 A1 | 9/2015 | Stringham | |
| 2015/0341224 A1 | 11/2015 | Van et al. | |
| 2015/0347641 A1 | 12/2015 | Gristede et al. | |
| 2016/0103943 A1 | 4/2016 | Xia et al. | |
| 2016/0275213 A1 | 9/2016 | Tomita | |
| 2017/0060204 A1 | 3/2017 | Gangwar et al. | |
| 2017/0063734 A1 | 3/2017 | Kumar | |
| 2017/0132350 A1 | 5/2017 | Janac | |
| 2017/0177778 A1 | 6/2017 | Lescure | |
| 2017/0193136 A1 | 7/2017 | Prasad et al. | |
| 2018/0115487 A1 | 4/2018 | Thubert et al. | |
| 2018/0144071 A1 | 5/2018 | Yu et al. | |
| 2018/0227180 A1* | 8/2018 | Rao | G06F 30/392 |
| 2019/0073440 A1 | 3/2019 | Farbiz et al. | |
| 2019/0205493 A1 | 7/2019 | Garibay et al. | |
| 2019/0246989 A1 | 8/2019 | Genov et al. | |
| 2019/0251227 A1 | 8/2019 | Fink | |
| 2019/0260504 A1 | 8/2019 | Philip et al. | |
| 2019/0363789 A1 | 11/2019 | Lee et al. | |
| 2020/0092230 A1 | 3/2020 | Schultz et al. | |
| 2020/0162335 A1 | 5/2020 | Chen et al. | |
| 2020/0234582 A1 | 7/2020 | Mintz | |
| 2020/0366607 A1 | 11/2020 | Kommula et al. | |
| 2021/0203557 A1 | 7/2021 | Cherif et al. | |
| 2021/0320869 A1 | 10/2021 | Bourai et al. | |
| 2021/0409284 A1* | 12/2021 | Cherif | H04L 41/0803 |
| 2022/0294704 A1 | 9/2022 | Lescure et al. | |

FOREIGN PATENT DOCUMENTS

| | | | | |
|---|---|---|---|---|
| CN | 113051215 A | | 6/2021 | |
| CN | 113055219 A | * | 6/2021 | G06F 30/32 |
| DE | 102015014851 A1 | | 5/2016 | |
| EP | 3842987 A1 | * | 6/2021 | G06F 30/32 |
| EP | 4024262 A1 | * | 7/2022 | G06F 15/7825 |
| EP | 4057179 A1 | * | 9/2022 | G06F 15/7825 |

OTHER PUBLICATIONS

U.S. Appl. No. 17/134,384, filed Dec. 26, 2020, Federico Angiolini.

U.S. Appl. No. 17/665,578, filed Feb. 6, 2022, K. Charles Janac.

"a distributed interleaving scheme for efficient access to widelO dram memory", Seiculescu Ciprian, Benini Luca, De Micheli Giovanni, CODES+ISSS'12 (Year: 2012).

"Thread-Fair Memory Request Reordering"; Kun Fang, Nick Iliev, Ehsan Noohi, Suyu Zhang, and Zhichun Zhu; Dept. of ECE, Univeristy of Illinois at Chicago; JWAC-3 Jun. 9, 2012.

19th Asia and South Pacific Design Automation Conference Alberto Ghiribaldi, HervéTatenguem Fankem, Federico Angiolini, Mikkel Stensgaard, Tobias Bjerregaard, Davide Bertozzi A Vertically Integrated and Interoperable Multi-Vendor Synthesis Flow for Predictable NoC Design in Nanoscale Technologies.

ACM ICCAD '06 Srinivasan Murali, Paolo Meloni, Federico Angiolini, David Atienza, Salvatore Carta, Luca Benini, Giovanni De Micheli, Luigi Raffo Designing Application-Specific Networks on Chips with Floorplan Information p. 8, Figure 8.

Annual IEEE International SoC Conference Proceedings Mohammad reza Kakoee, Federico Angiolin, Srinivasan Murali, Antonio Pullini, Ciprian Seiculescu, and Luca Benini A Floorplan-aware Interactive Tool Flow for NoC Design and Synthesis pp. 1, 2, 4 2009 Belfast, Northern Ireland, UK.

K. R. Manik et al., "Methodology for Design of Optimum NOC Based on I PG," 2017 Int'l Conference on Algorithms, Methodology, Model and Applications in Emerging Technologies (ICAM-MAET), Chennai, India, IEEE, 6 pages. (Year: 2017).

Luca Benini: "Application specific Noc design", Design, Automation and Test in Europe, 2006, DATE '06 : Mar. 6-10, 2006, [Munich, Germany; Proceedings] / [Sponsored By the European Design and Automation Association], IEEE, Piscataway, NJ, USA, Mar. 6, 2006 (Mar. 6, 2006), pp. 491-495, XP058393584, ISBN: 9783981080100.

(56) References Cited

OTHER PUBLICATIONS

Dumitriu Vet Al: "Throughput-Oriented Noc Topology Generation and Analysis for High Performance SoCs", IEEE Transactions On Very Large Scale Integration (VLSI) Systems, IEEE Service Center, Piscataway, NJ, USA, vol. 17, No. 10, Oct. 1, 2009 (Oct. 1, 2009), pp. 1433-1446, XP011267808, ISSN: 1063-8210, DOI: 10.1109/TVLSI.2008.2004592.
Fangfa Fu et al.: "A Noc performance evaluation platform supporting designs at multiple levels of abstraction", Industrial Electronics and Applications, 2009. ICIEA 2009. 4th IEEE Conference On, IEEE, Piscataway, NJ, USA, May 25, 2009 (May 25, 2009), pp. 425-429, XP031482069, ISBN: 978-1-4244-2799-4 *abstract* * p. 426-p. 429 *.
Murali et al.: "Synthesis of Predictable Networks-on-Chip-Based Interconnect Architectures for Chip Multiprocessors", IEEE Transactions On Very Large Scale Integration (VLSI) Systems, IEEE Service Center, Piscataway, NJ, USA, vol. 15, No. 8, Aug. 1, 2007 (Aug. 1, 2007), pp. 869-880, XP011187732, ISSN: 1063-8210, DOI: 10.1109/TVLSI.2007.900742.
Picornell Tomas Tompic@Gap.Upv.Es et al.: "DCFNoC A Delayed Conflict-Free Time Division Multiplexing Network on Chip", Designing Interactive Systems Conference, ACM, 2 Penn Plaza, Suite 701 New York NY10121-0701 USA, Jun. 2, 2019 (Jun. 2, 2019), pp. 1-6, XP058637807, DOI: 10.1145/3316781.3317794 ISBN: 978-1-4503-5850-7.
Alessandro Pinto et al, "System level design paradigms", ACM Transactions On Design Automation of Electronic Systems, ACM, New York, NY, US, (Jun. 7, 2004), vol. 11, No. 3, doi:10.1145/1142980.1142982, ISSN 1084-4309, pp. 537-563, XP058222500.
Bo Huang et al, "Application-Specific Network-on-Chip synthesis with topology-aware floorplanning", Integrated Circuits and Systems Design (SBCCI), 2012 25th Symposium on, IEEE, (Aug. 30, 2012), doi:10.1109/SBCCI.2012.6344421, ISBN 978-1-4673-2606-3, pp. 1-6, XP032471227.
Jean-Jacques Lecler et al: Application driven network-on-chip architecture exploration & refinement for a complex SoC, Design Automation for Embedded Systems, vol. 15 No. 2, Apr. 7, 2011, DOI: 10.1007/S10617-011-9075-5.
Partha et al., Design, Synthesis, and Test of Networks on Chips, IEEE (Year: 2005).
Srinivasan K et al, "Linear programming based techniques for synthesis of network-on-chip architectures", Computer Design: VLSI in Computers and Processors, 2004. ICCD 2004. Pr oceedings. IEEE International Conference on San Jose, CA, USA Oct. 11-13, 2004, Piscataway, NJ, USA,IEEE, (Oct. 11, 2004), doi:10.1109/ICCD.2004.1347957, ISBN 978-0-7695-2231-9, pp. 422-429, XP010736641.
Srinivasan Murali et al: "Mapping and physical planning of networks-on-chip architectures with quality-of-service guarantees", Proceedings of The 2005 Asia and South Pacific Design Automation Conference, Jan. 18, 2005, DOI: 10.1145/1120725.1120737.
Tobias Bjerregaard et al: "A Router Architecture for Connection-Oriented Service Guarantees in the MANGO Clockless Network-on-Chip", Proceedings of the IEEE Conference and Exhibition on Design, Automation, and Test in Europe, Mar. 7, 2005, DOI: 10.1109/DATE.2005.36.
Wei Zhong et al: "Floorplanning and Topology Synthesis for Application-Specific Network-on-Chips", IEICE Transactions on Fundamentals of Electronics< Communications and Computer Sciences, Jun. 1, 2013, DOI: 10.1587/TRANSFUN.E96.A.1174.
Zhou Rongrong et al: A Network Components Insertion Method for 3D Application-Specific Network-on-Chip, Proceedings of the 11th IEEE International Conference on ASIC, Nov. 3, 2015, pp. 1-4, DOI: 10.1109/ASICON.2015.7516952.
Francesco Robino: "A model-based design approach for heterogeneous NoC-based MPSoCs on FPGA", Jul. 1, 2014 (Jul. 1, 2014), XP002806918, Retrieved from the Internet: URL: http://www.divaportal.org/smash/get/diva2:718518/FULLTEXT02.pdf [retrieved on Jun. 22, 2022].
Anonymous: "Network on a chip—Wikipedia", Jun. 15, 2021, https//en.wikipedia org/w/index.php? title=Network_on_a_chip &oldid= 1028654828.
Haytham Elmiligi et al: "Networks-on-chip topology optimization subject to power, delay, and reliability constraints", IEEE International Symposium on Circuits and Systems. May 30, 2010, pp. 2354-2357, DOI: 10.1109/ISCAS.2010.5537194.
Jain R. et al: "Predicting system-level area and delay for pipelined and nonpipelined designs", IEEE Transactions on Computer Aided Design of Integrated Circuits and Systems, vol. 11, No. 8, Jan. 1, 1992, pp. 955-965. DOI: 10.1109/43.149767.
Jingye Xu et al: "Latch Based Interconnect Pipelining For High Speed Integrated Circuits", Proceedings of the International Conference On Electro/Information Technology. May 1, 2006, pp. 295-300, DOI: 10.1109/EIT.2006.252152.
Jun Minje et al: "Exploiting Implementation Diversity and Partial Connection of Routers in Application-Specific Network-on-Chip Topology Synthesis", IEEE Transactions on Computers, IEEE, USA, vol. 63, No. 6, Jun. 1, 2014 (Jun. 1, 2014), pp. 1434-1445, XP011550397. ISSN: 0018-9340, DOI: 10.1109/TC.2012.294.
Saponara S et al: "Design and coverage-driven verification of a novel network-interface IP macrocell for network-on-chip interconnects", Microprocessors and Microsystems, vol. 35, No. 6 , pp. 579-592, XP028255708, ISSN: 0141-9331, DOI: 10 1016/J.MICPRO.2011.06.005.
Saponara Sergio et al: "Configurable network-on-chip router macrocells", Microprocessors and Microsystems, IPC Business Press Ltd. London, GB, vol. 45, Apr. 29, 2016 (Apr. 29, 2016), pp. 141-150, XP029678799, ISSN: 0141-9331. DOI: 10.1016/J.MICPRO.2016.04.008.
Song Z et al: "A NoC-Based High Performance Deadlock Avoidance Routing Algorithm", Computer and Computational Sciences, 2008, IMSCCS '08. International Multisymposiums On, IEEE, Piscataway, NJ, USA, Oct. 18, 2008, pp. 140-143, XP031411025, ISBN: 978-0-7695-3430-5.

* cited by examiner

SYSTEM AND METHOD TO GENERATE A NETWORK-ON-CHIP (NOC) DESCRIPTION USING INCREMENTAL TOPOLOGY SYNTHESIS

CROSS REFERENCE TO RELATED APPLICATION

This application is a continuation of U.S. Non-Provisional application Ser. No. 16/728,185 filed on Dec. 27, 2019 and tiled SYSTEM AND METHOD FOR INCREMENTAL TOPOLOGY SYNTHESIS OF A NETWORK-ON-CHIP by Moez CHERIF and Benoit de LESCURE, which issued on Apr. 27, 2021 as U.S. Pat. No. 10,990,724, the entire disclosure of which is incorporated herein by reference.

FIELD OF THE INVENTION

The present technology is in the field of system design and, more specifically, related to topology synthesis to generate a network-on-chip (NoC) description.

BACKGROUND

Multiprocessor systems have been implemented in systems-on-chips (SoCs) that communicate through network-on-chips (NoCs). The SoCs include instances of master (initiators) intellectual properties (IPs) and slave (targets) IPs. Transactions are sent from a master to one or more slaves using industry-standard protocols. The master, connected to the NoC, sends a request transaction to a slave, using an address to select the slave. The NoC decodes the address and transports the request from the master to the slave. The slave handles the transaction and sends a response transaction, which is transported back by the NoC to the master.

Typically, a NoC description is generated using a synthesis tool during the design process. The tool generates a NoC from a set of constraints. If changes are made, then the tool will have to be restarted and re-executed. Accordingly, every time the input constraints change, the tool is restarted or the synthesis is re-executed. As such, there is a risk of giving a completely different solution from one run to the next, even if the changes to the constraints are limited or minor. This is due to the nature of the network synthesis process, which typically uses a constraint solver approach to minimizing metrics, and the constraint solver may find very different solutions in response to slightly different set of constraints. As such, the tool may find a different solution every time it runs for slightly different constraints. Thus, the tool has a reduced usability when used by a SoC designer to automatically create the NoC. During the design time of SoC, the constraints change and evolve. If the tool generates substantially different results each time the software runs and every time the user makes a small change, then this will lead to the designer being unable to reuse some of the implementation work already done.

For example, consider the situation when the NoC has already been generated from a set of constraints. The result has been processed through the ASIC design flow with logic synthesis and place and route steps done. The steps typically take a lot of time, e.g. multiple days. After this first generation, it is decided to remove a component from the SoC, which result in slight modification of the floorplan and the connectivity. The tool generating the NoC is run again with the updated constraints. The tool gives a completely different result compared to the first run. As such, all the previous work on logic synthesis and place and route need to be done again from scratch, even if the constraint change was very small. This is very costly for the project.

Accordingly, there is a need for a tool that ensures, as between two different runs using two different set of small or minor constraint changes, minimum changes to the solution, which is needed to adapt to the changed constraints. Therefore, what is needed is a method to allow the tool to generate a NoC from a set of constraints while producing consistent results between runs that have slightly different/ varying constraints, with the goal of minimizing the differences between the current run result and the previous run result.

SUMMARY OF THE INVENTION

In accordance with various embodiments and aspects of the invention, systems and methods are provided to allow a tool to synthesize and generate a NoC from a set of constraints while producing consistent results between synthesis runs that have slight varying constraints. One advantage of the invention is minimizing the differences between results of different synthesis runs, such as two consecutive synthesis runs, when there is a minor change in any one constraint.

DETAILED DESCRIPTION

The following describes various examples of the present technology that illustrate various aspects and embodiments of the invention. Generally, examples can use the described aspects in any combination. All statements herein reciting principles, aspects, and embodiments as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

It is noted that, as used herein, the singular forms "a," "an" and "the" include plural referents unless the context clearly dictates otherwise. Reference throughout this specification to "one embodiment," "an embodiment," "certain embodiment," "various embodiments," or similar language means that a particular aspect, feature, structure, or characteristic described in connection with the embodiment is included in at least one embodiment of the invention.

As used herein, a "master" and a "initiator" refer to similar intellectual property (IP) modules or units and the terms are used interchangeably within the scope and embodiments of the invention. As used herein, a "slave" and a "target" refer to similar IP modules or units and the terms are used interchangeably within the scope and embodiments of the invention. As used herein, a transaction may be a request transaction or a response transaction. Examples of request transactions include write request and read request.

Thus, appearances of the phrases "in one embodiment," "in at least one embodiment," "in an embodiment," "in certain embodiments," and similar language throughout this specification may, but do not necessarily, all refer to the same embodiment or similar embodiments. Furthermore, aspects and embodiments of the invention described herein are merely exemplary, and should not be construed as limiting of the scope or spirit of the invention as appreciated by those of ordinary skill in the art. The disclosed invention is effectively made or used in any embodiment that includes any novel aspect described herein. All statements herein reciting principles, aspects, and embodiments of the invention are intended to encompass both structural and functional equivalents thereof. It is intended that such equivalents include both currently known equivalents and equivalents developed in the future. Furthermore, to the extent that the terms "including", "includes", "having", "has", "with", or variants thereof are used in either the detailed description and the claims, such terms are intended to be inclusive in a similar manner to the term "comprising."

Figure 1:
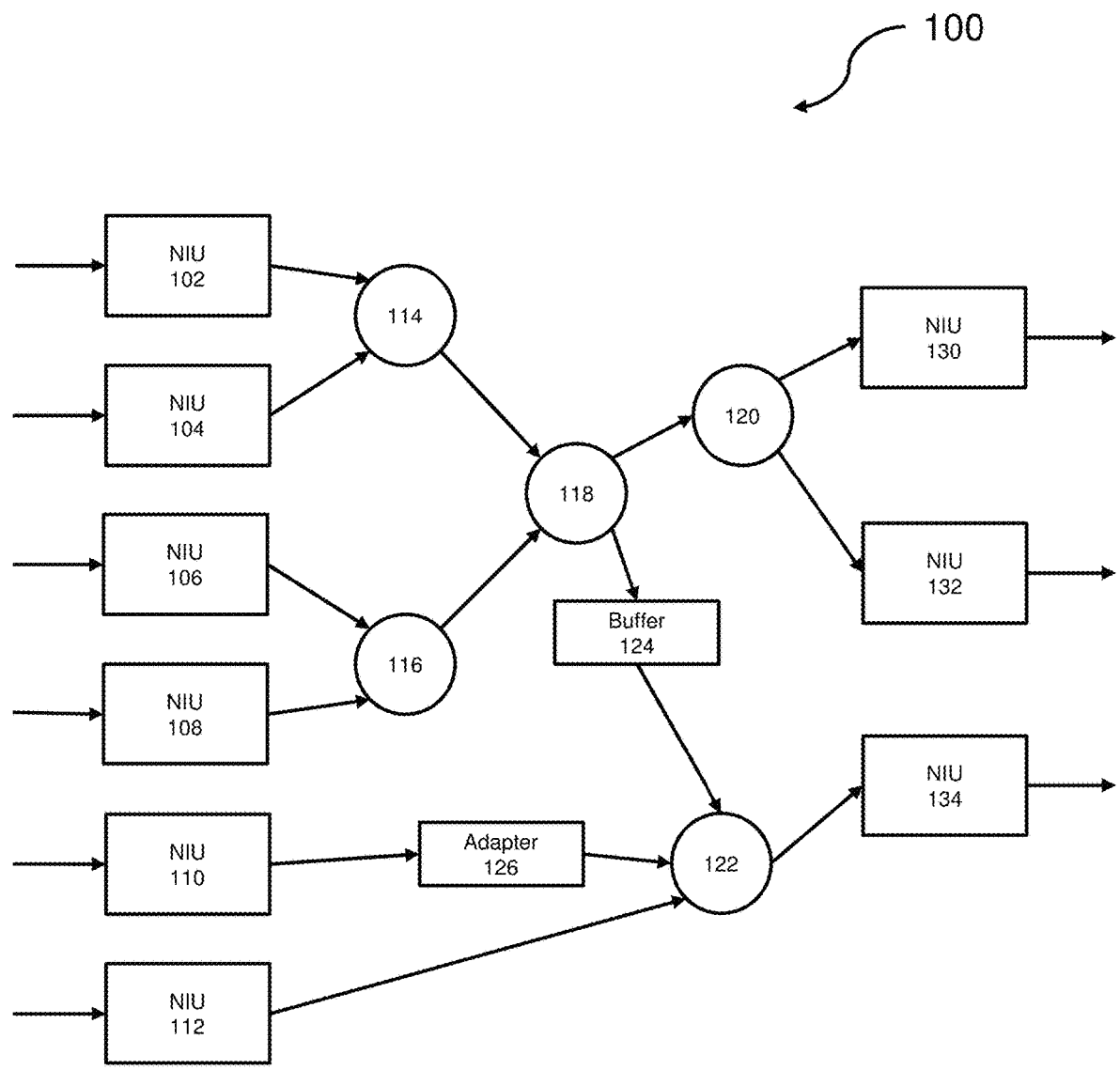
FIG. 1 shows a logic view of a network-on-chip (NoC) that includes an assembly of various elements to create the network.

Referring now to FIG. 1, a network-on-chip (NoC) 100 is shown in accordance with various aspects and embodiments of the invention. The NoC uses elementary network functions that are assembled, such as: network interface units (NIUs) 102, 104, 106, 108, 110, 112, 130, 132, and 134; switches 114, 116, 118, 120, and 122; adapters, such as adapter 126; and buffers, such as buffer 124. The NoC elementary network functions use an internal transport protocol, which is specific to the NoC 100, to communicate with each other, typically based on the transmission of packets. The NIUs convert the protocol used by the attached system-on-chip (SoC) unit (not shown), into the transport protocol used inside the NoC 100. The switches route flows of traffic between source and destinations. The buffer 124 is used to insert pipelining elements to span long distances, or to store packets to deal with rate adaptation between fast senders and slow receivers or vice-versa. The adapter 126 handles various conversions between data width, clock, and power domains.

Figure 2:
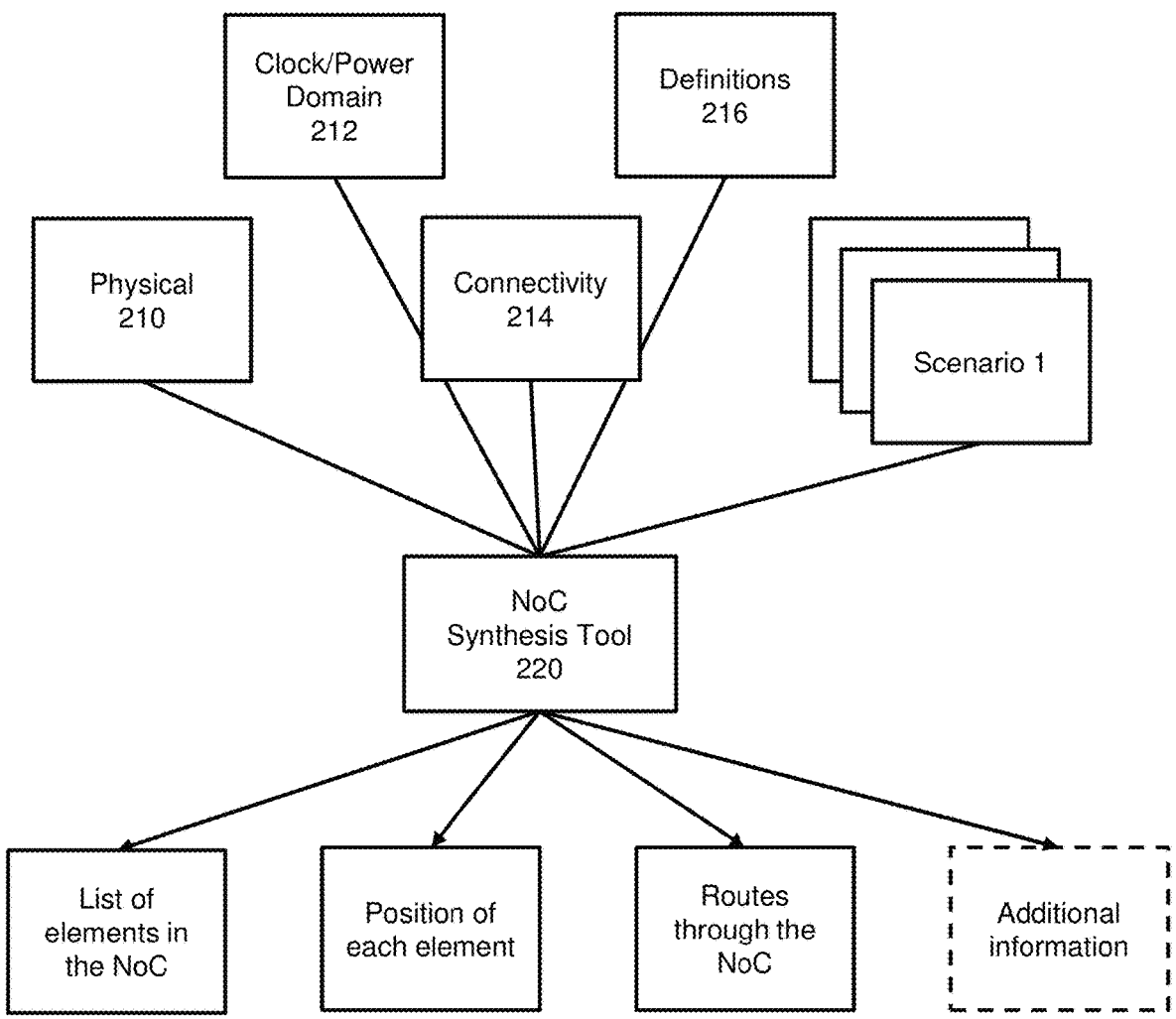
FIG. 2 shows a method for generating a NoC description or synthesis based on a set of constraints.

Referring now to FIG. 2, a process is shown for generating synthesis of a NoC, such as the NoC of FIG. 1. The process includes receiving as inputs a set of constraints, which may include: physical (floorplan related, technology related) 210; power and clock domain definitions 212; connectivity of the elements 214; definitions of connected IP 216; performance related constraints including latency and throughput through the NoC; and any other kind of metric to be optimized, such as area of the resulting network and wire length. Additionally, various scenarios, such as scenario 1, can be included as a constraint. The information is provided to a NoC synthesis tool 220.

Figure 3:
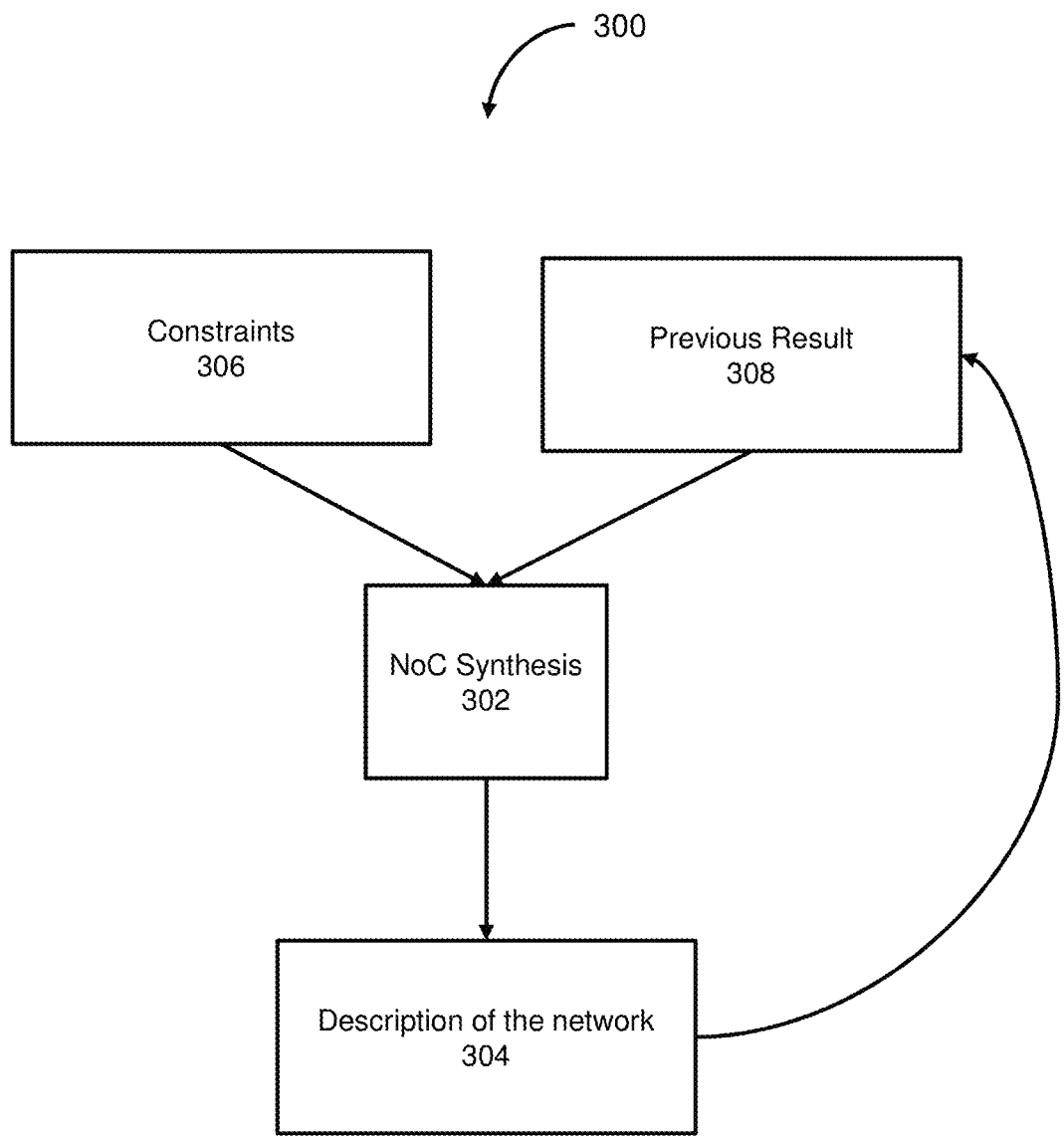
FIG. 3 shows a process for NoC synthesis using the previous run as a constraint in accordance with various aspects and embodiments of the invention.

Referring now to FIG. 3, a process 300 is shown wherein a tool 302 generates a NoC description 304 from a set of input constraints 306. The tool 302 also accepts, as an additional set of constraints, a previous result 308 associated with a previous run. The tool 302 uses the previous result 308 to minimize the amount of change in the new result compared to the old result, such as the NoC description 304.

Thus, the tool 302 uses given constraints, such as those outline in FIG. 2, along with the previous result, to generate a new result. In accordance with some aspects of the invention, acceptance of a description of previous result, as a constraint, is optional. Thus, the designer or user decides if using the previous result for subsequent runs is important to minimize the amount of change compared to the previous run. In accordance with some aspects of the invention, for a first run there is no previous result.

In accordance with the various aspects and embodiments of the invention, the format and information of the constraints, the result, and the previous result used as constraint, are all implementation dependent. In accordance with some aspects of the invention, the previous result description includes more than just the previous NoC description. The tool receives the data that includes information about global parameters used in the previous run. The tool re-consumes data generated from the previous run and maintains some of the global parameters. The inclusion of the previous run also provides profile information about the solution and decisions made throughout the process of developing the constraints that were used as part of the previous run, including the global information. As such, the global information is persistent and reintroduced to be re-consumed during subsequent runs. For example, while the location of an element may be slightly altered, the physical neighborhood where that element is to be re-positioned is retained along with the definitions and connectivity constraints. Additional examples include possibly some other internal data structures used by the synthesis tool, such as intermediate calculations, to produce the resulting synthesis.

Figure 4:
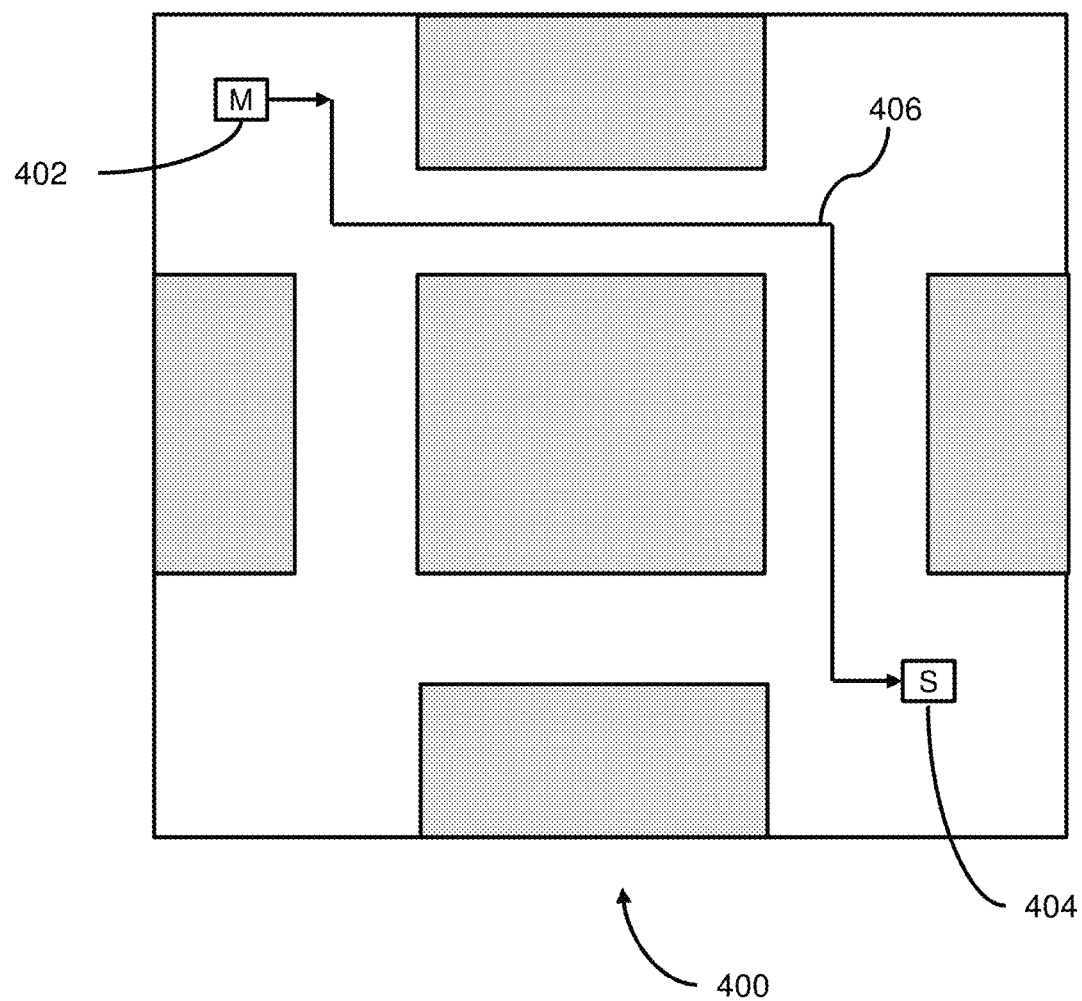
FIG. 4 shows an implementation of a NoC based on an initial run in accordance with the various aspects and embodiments of the invention.

Referring now to FIG. 4, a path 406 is shown between a master (M) 402 and a slave (S) 404 through a NoC 400. The path 406 is determined using a tool performing a synthesis after an initial run.

Figure 5:
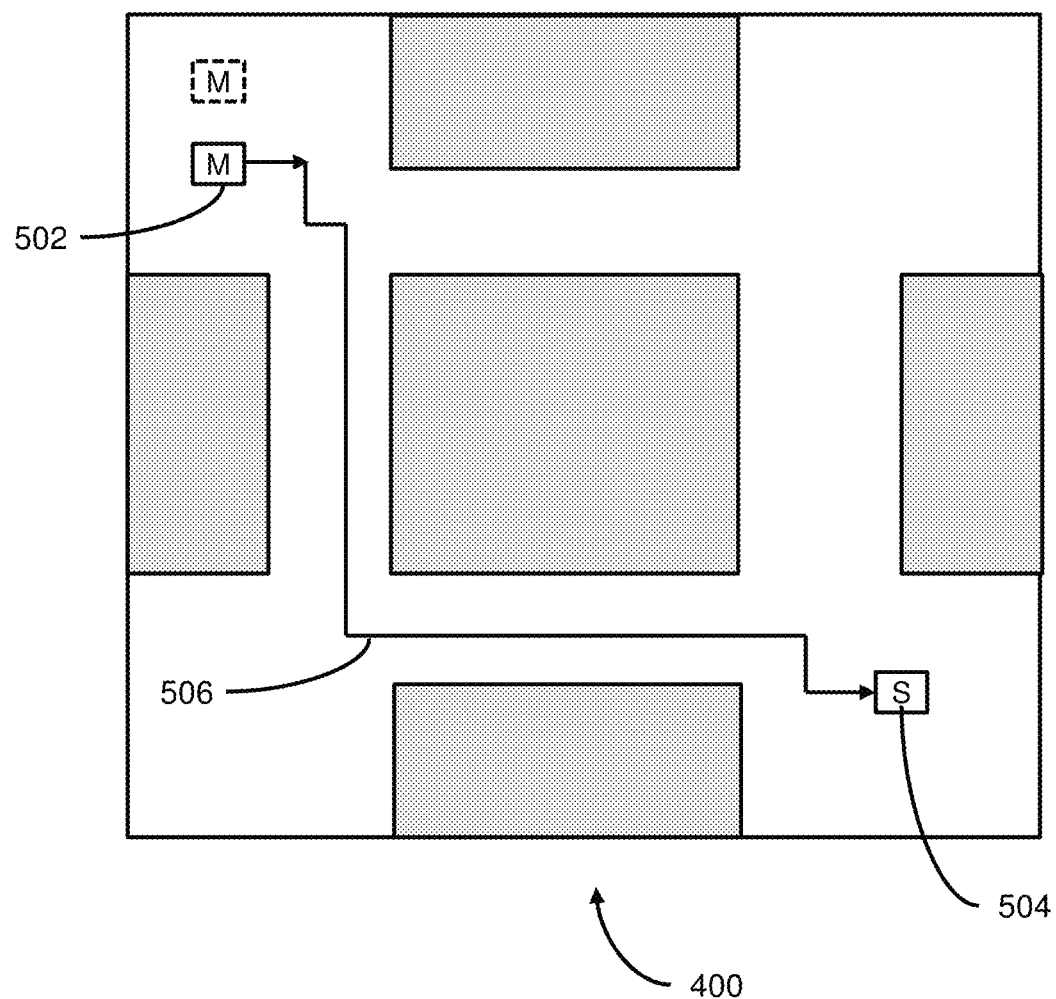
FIG. 5 shows an implementation of a NoC based on a subsequent run relative to the synthesis of the NoC of FIG. 4, in accordance with the various aspects of the invention.

Referring now to FIG. 5, one option for a path 506 is shown based on a small constraint change, such as a change in a location of a master 502, in accordance with the various aspects and embodiment of the invention. Based on the new position of the master 502, which is a small constraint variation, a path 506 is determined by the tool, which has almost the same length as the path 406 of FIG. 4, based on Manhattan distance measurements. The path 406 has a large change relative to the path 506.

Figure 6:
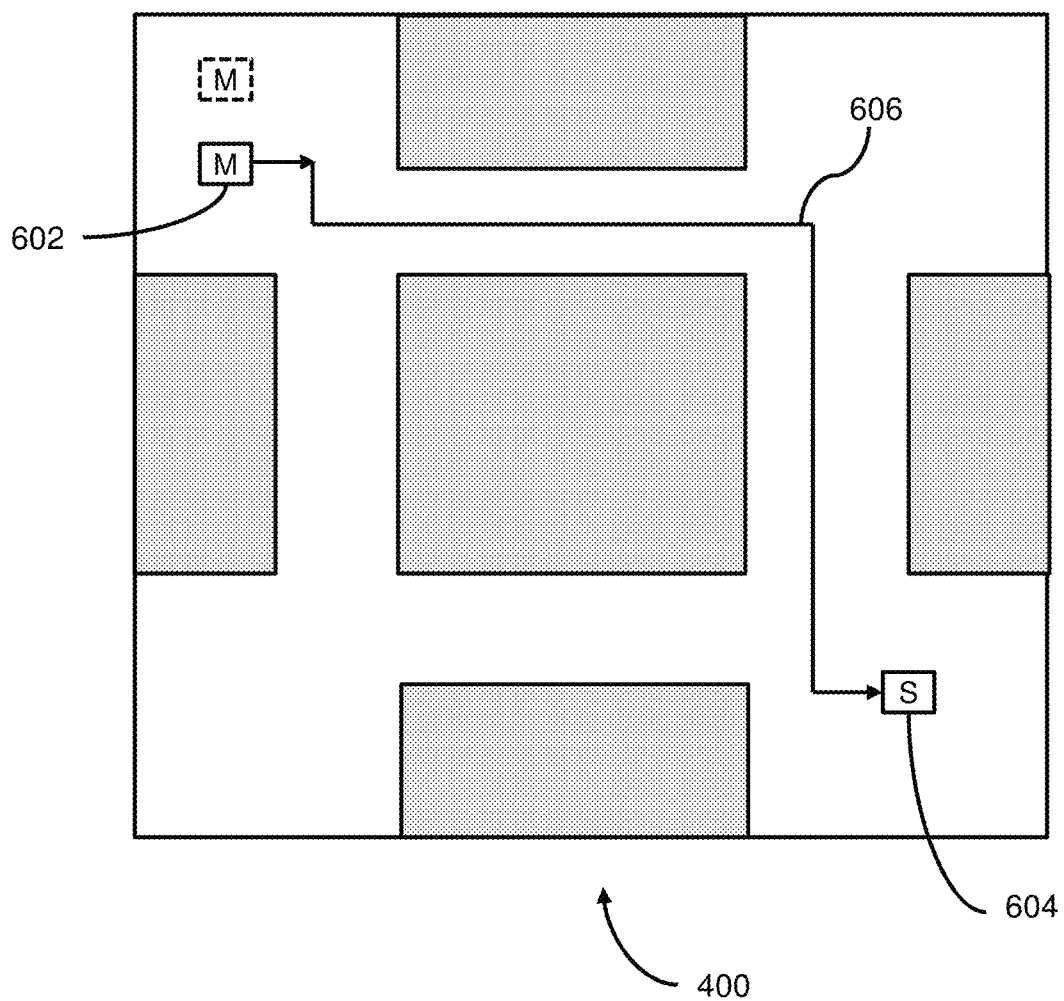
FIG. 6 shows an implementation of a NoC based on a subsequent run relative to the synthesis of the NoC of FIG. 4, in accordance with the various aspects of the invention.

Referring now to FIG. 6, another option for a path 606 through the NoC 400 is shown between a master 602, which is at a new location, and a slave 604 in accordance with the various aspects and embodiment of the invention. The master 602 is at a new location relative to the previous location, as shown by the broken detail lines. Based on the new position of the master 602, which is a small constraint variation relative to the original location of the master 602, a path 606 is determined by the tool, which has almost the same length as the path 406 of FIG. 4, based on Manhattan distance measurements. The path 606 has a small or minimum change relative to the path 406 from the previous run.

Referring collective to FIG. 4, FIG. 5, and FIG. 6, the tool generates the results for the second or subsequent runs. The tool might generate any number of options, such as the path 506 and the path 606. Providing the tool with the previous run, as one constraint, allows the tool to narrow the options to a path with the minimum change relative to the previous run that generated path 406. Accordingly, the ability to consider the initial run of the tool, which generated the path 406, as a constraint will enhance performance of the tool and minimizes variations when analyzing options, such as the path 506 and the path 606.

In accordance with some aspects and embodiments, the tool can be modified to use the same approach for only sub-sections of the NoC.

In accordance with some aspects and embodiments, the tool can be used to ensure multiple iterations of the synthesis are done for incremental optimization of the NoC, which includes a situation when one constraint provided to the tool is information about the previous run.

Certain methods according to the various aspects of the invention may be performed by instructions that are stored upon a non-transitory computer readable medium. The non-transitory computer readable medium stores code including instructions that, if executed by one or more processors, would cause a system or computer to perform steps of the method described herein. The non-transitory computer readable medium includes: a rotating magnetic disk, a rotating optical disk, a flash random access memory (RAM) chip, and other mechanically moving or solid-state storage media. Any type of computer-readable medium is appropriate for storing code comprising instructions according to various example.

Certain examples have been described herein and it will be noted that different combinations of different components from different examples may be possible. Salient features are presented to better explain examples; however, it is clear that certain features may be added, modified and/or omitted without modifying the functional aspects of these examples as described.

Various examples are methods that use the behavior of either or a combination of machines. Method examples are complete wherever in the world most constituent steps occur. For example and in accordance with the various aspects and embodiments of the invention, IP elements or units include: processors (e.g., CPUs or GPUs), random-access memory (RAM—e.g., off-chip dynamic RAM or DRAM), a network interface for wired or wireless connections such as ethernet, WiFi, 3G, 4G long-term evolution (LTE), 5G, and other wireless interface standard radios. The IP may also include various I/O interface devices, as needed for different peripheral devices such as touch screen sensors, geolocation receivers, microphones, speakers, Bluetooth peripherals, and USB devices, such as keyboards and mice, among others. By executing instructions stored in RAM devices processors perform steps of methods as described herein.

Some examples are one or more non-transitory computer readable media arranged to store such instructions for methods described herein. Whatever machine holds non-transitory computer readable media comprising any of the necessary code may implement an example. Some examples may be implemented as: physical devices such as semiconductor chips; hardware description language representations of the logical or functional behavior of such devices; and one or more non-transitory computer readable media arranged to store such hardware description language representations. Descriptions herein reciting principles, aspects, and embodiments encompass both structural and functional equivalents thereof. Elements described herein as coupled have an effectual relationship realizable by a direct connection or indirectly with one or more other intervening elements.

Practitioners skilled in the art will recognize many modifications and variations. The modifications and variations include any relevant combination of the disclosed features. Descriptions herein reciting principles, aspects, and embodiments encompass both structural and functional equivalents thereof. Elements described herein as "coupled" or "communicatively coupled" have an effectual relationship realizable by a direct connection or indirect connection, which uses one or more other intervening elements. Embodiments described herein as "communicating" or "in communication with" another device, module, or elements include any form of communication or link and include an effectual relationship. For example, a communication link may be established using a wired connection, wireless protocols, near-filed protocols, or RFID.

The scope of the invention, therefore, is not intended to be limited to the exemplary embodiments shown and described herein. Rather, the scope and spirit of present invention is embodied by the appended claims.

What is claimed is:

1. A method for topology synthesis of a network-on-chip (NoC) using a tool for synthesis and generation of the NoC, the method comprising:
    generating, using the tool, an initial synthesis of the NoC based on a plurality of constraints;
    providing a result based on the synthesis;
    receiving an updated plurality of constraints, wherein the updated plurality of constraints include at least one change to the plurality of constraints;
    generating, using the tool, a second synthesis of the NoC based on the updated plurality of constraints and the result from a previous run; and
    providing an updated result based on the second synthesis,
    wherein the previous run is provided to ensure that the updated result represents a minimum change between the result and the update result when there is a minimum change between the plurality of constraints and the updated plurality of constraints.

2. The method of claim 1 further comprising generating a list of network elements and configurations as part of the updated result.

3. The method of claim 1 further comprising generating a position for each of a plurality of network elements within a floorplan of the NoC.

4. The method of claim 1 further comprising generating routes within a floorplan of the NoC for a plurality of connected network elements selected from a plurality of network elements.

5. The method of claim 1, wherein the plurality of constraints includes at least one of:
    physical information about a floorplan;
    clock domain definition;
    power domain definition;
    initiator definition;
    target definition;
    data width;
    path width;
    connectivity between initiators and targets; and
    traffic class definition.

6. The method of claim 1, wherein the updated plurality of constraints includes at least one change in at least one constraint selected from the plurality of constraints.

7. The method of claim 1 further comprising receiving a plurality of global parameters used in the previous run.

8. The method of claim 7, wherein the previous run includes profile information.

9. A non-transitory computer readable medium for storing code, which when executed by one or more processors, would cause the processor to:
    process, using a tool, a plurality of constraints to generate an initial synthesis of a network-on-chip (NoC);
    provide a result based on the initial synthesis;

receive, at the tool, an updated plurality of constraints that includes one or more changes to the plurality of constraints;

generate, using the tool, a second synthesis for the NoC using the updated plurality of constraints and the result based on the initial synthesis; and providing an updated result based on the second synthesis, wherein the tool utilizes a previous synthesis constraint to ensure that the updated result represents a consistent change between the result and the update result when there is a minor change between the plurality of constraints and the updated plurality of constraints and the minor change includes the previous synthesis constraint.

10. The non-transitory computer readable medium of claim 9, wherein the plurality of constraints includes at least one of:
   physical location information for a plurality of IP elements in a floorplan;
   clock domain definition;
   power domain definition;
   initiator definition;
   target definition;
   data width;
   path width;
   connectivity between initiators and targets; and
   traffic class definition.

11. The non-transitory computer readable medium of claim 9, wherein the updated plurality of constraints include updating at least one of:
   physical location information for a plurality of IP elements in a floorplan;
   clock domain definition;
   power domain definition;
   initiator definition;
   target definition;
   data width;
   path width;
   connectivity between initiators and targets; and
   traffic class definition.

12. A tool for synthesis and generation of a network-on-chip (NoC), the tool comprising computer implemented code stored on a non-transitory computer readable medium, which is executed by a processor to cause the tool to:
   generate a synthesis for the NoC based on a plurality of constraints;
   provide a result for the synthesis;
   receive one or more changes to the plurality of constraints;
   generate an updated synthesis for the NoC based on the one or more changes and the result, wherein the tool utilizes the result as a constraint to minimize variations between the synthesis and the updated synthesis; and
   providing an updated result based on the updated synthesis.

13. The tool of claim 12, wherein the one or more changes includes a change in a location of an Intellectual Property (IP) element, which is in communication with the NoC, in a physical floorplan.

14. The tool of claim 13, wherein the tool is caused to determine an updated data path for the IP element based on the change in position.

* * * * *